R. P. SIMS.
Improvement in Trace-Detaching Whiffletrees.

No. 128,331. Patented June 25, 1872.

128,331

UNITED STATES PATENT OFFICE.

ROBERT P. SIMS, OF MEXICO, MISSOURI.

IMPROVEMENT IN TRACE-DETACHING WHIFFLETREES.

Specification forming part of Letters Patent No. 128,331, dated June 25, 1872.

*To all whom it may concern:*

Be it known that I, ROBERT P. SIMS, of Mexico, in the county of Adrian and State of Missouri, have invented a new and Improved Trace-Detaching Whiffletree; and I do hereby declare that the following is a full, clear, and exact description thereof, which will enable others skilled in the art to make and use the same, reference being had to the accompanying drawing forming part of this specification, in which—

Figure 1:
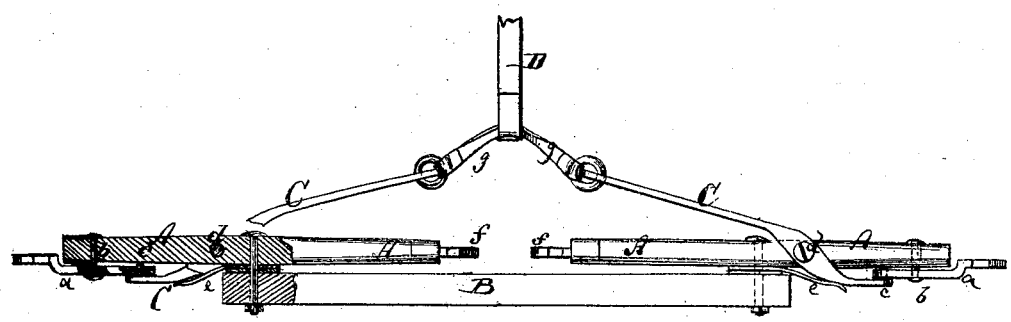
Figure 2:
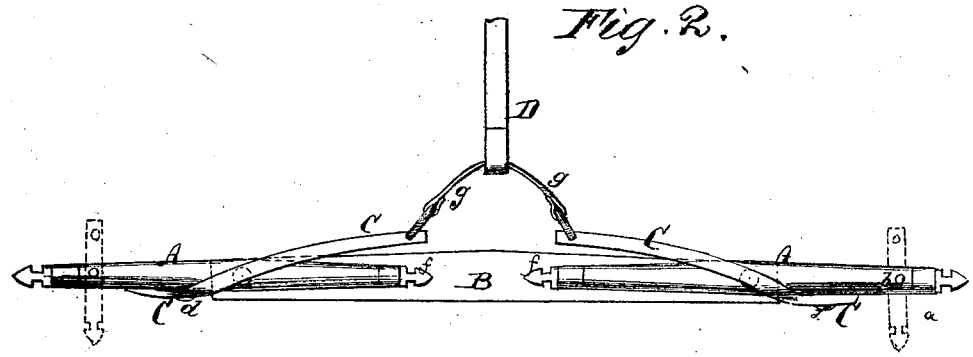

Figure 1 represents a front view of my improved trace-detaching whiffletree. Fig. 2 is a top view of the same.

Similar letters of reference indicate corresponding parts.

This invention relates to a new whiffletree-attachment for suddenly disconnecting the traces in case the horses run away or become shy. The invention consists in such a combination with the whiffletree of a pivoted trace-holder and spring locking-lever that, by pulling the lever the trace-holder will be released to swing aside and detach the traces.

A A, in the drawing, are two whiffletrees secured to the double-tree B in the ordinary manner. The outer trace-holder $a$ of each whiffletree is by a pin, $b$, pivoted to the same, and can turn on its pivot. It is held in line with the whiffletree by a spring-lever, C, which has a projecting pin, $c$, passing through the inner end of trace-holder into the whiffletree. The lever C is pivoted at $d$ to the face of the latter, and is by a spring, $e$, held up against the plate $a$, as is clearly shown in Fig. 1. The trace-holders $f$ at the inner ends of the whiffletrees are secured in the ordinary manner. The two levers C C are, by a cord or strap, $g$, connected with a line, D, which extends to the driver's seat, or within convenient reach of the driver. Whenever the horses run away, or are otherwise troublesome, the line D is pulled so as to draw the pins $c$ out of the trace-holders, when they will be swung forward on their pivots, as indicated by dotted lines in Fig. 2. The outer traces will be instantly detached when the holders are thus swung ahead. After they are loose the inner traces will swing the whiffletrees around and be readily detached therefrom.

Having thus described my invention, I claim as new and desire to secure by Letters Patent—

The combination, on a whiffletree, of the pivoted trace-holders $a$ $a$ with the locking-lever C and pins $c$, substantially as herein shown and described.

ROBERT P. SIMS.

Witnesses:
E. B. NORRIS,
S. J. NEKEM.